3,594,143
PROCESS OF FLOATING GLASS ON MOLTEN METAL WITH A PARTICULAR ATMOSPHERE
Iftikhar Mohyuddin, Ormskirk, England, assignor to Pilkington Brothers Limited, Liverpool, Lancashire, England
No Drawing. Filed June 27, 1968, Ser. No. 740,461
Claims priority, application Great Britain, June 30, 1967, 30,385/67
Int. Cl. C03b 18/02
U.S. Cl. 65—32                                2 Claims

ABSTRACT OF THE DISCLOSURE

Glass is heated whilst in contact with a protective atmosphere which comprises hydrogen and methane, the methane being in a proportion of from 1% to 50% of the hydrogen present in order for a condition of equilibrium to be maintained to inhibit any reaction between the hydrogen and the elements which could be attacked thereby, such, for example, as carbon and silicon carbide.

BACKGROUND OF THE INVENTION (1) Field of the invention

This invention relates to improvements in or relating to the manufacture of glass.

During the manufacture of glass in accordance with modern techniques it is often necessary to maintain molten or heated glass in moulds, tanks, etc. under a protective atmosphere. Thus for example in the manufacture of flat glass by the so-called "float process" whereby the glass is in contact with a bath of molten metal and is advanced in ribbon form over the molten metal, the glass is covered by a protective atmosphere maintained in a head space over the bath.

(2) Description of the prior art

The glass may be delivered to the bath at a controlled rate as a formed ribbon of glass which is delivered onto the bath surface from forming rollers and is advanced along the bath in ribbon form being subjected to a superficial surface treatment as it is advanced along the bath and the ribbon being cooled as it approaches the outlet end of the bath until it is sufficiently stiffened to be taken unharmed from the bath and advanced on conveyor rolls to an annealing lehr.

In another way of operating molten glass is poured on to a bath of molten metal and is permitted to flow laterally unhindered on the bath to the limit of its free flow to form a buoyant body of molten glass from which a ribbon of glass is developed and advanced along the bath for cooling and subsequent discharge from the bath.

Carbon elements may form a part of the tank structure containing the bath of molten metal or may be associated with that tank structure. For example, the casting rolls which are supplied with molten glass from a fore-hearth and which roll a ribbon of glass which is immediately delivered on to the bath surface, may be made or carbon or provided with a carbon surface. These rolls are normally maintained in the same protective atmosphere as is maintained over the bath of molten metal. The molten metal bath is contained in an elongated tank structure and a roof structure over the tank structure defines the head space in which a protective atmosphere is maintained at a plenum. The casting rolls may be in a separate chamber at the inlet end of the bath in which a plenum of protective atmosphere is also maintained.

Further uses of carbon in association with the bath of molten metal, over which a ribbon of glass is being advanced in the "Float" process for the manufacture of flat glass, are the use of carbon surfaces embodied in the side walls of the tank structure at the surface level of the bath of molten metal against which the margins of the ribbon of glass slide. These carbon surfaces are exposed to the atmosphere in the head space over the bath. Carbon surfaces may be employed to define a channel down the centre of the tank structure, by being spaced from the side walls of the tank structure, a ribbon of glass being formed in this channel and advanced between the carbon surfaces defining the channel until the ribbon is sufficiently stiffened to maintain its form without being laterally retained.

Another application of carbon in the bath of molten metal is in the construction of a take-up roll mounted within the head space over the bath and having an operative surface above the surface level of the bath, which take-up roll is the first member to be contacted by the under-surface of stiffened ribbon of glass and which roll takes up that stiffened ribbon of glass and discharges it through the outlet from the bath. The protective atmosphere surrounds the take-up roll and ensures that this ribbon supporting roll is protected against corrosion.

Other elements which, in the "Float" process, are exposed to the protective atmosphere in the head space over the bath are heating elements mounted in the roof structure over the bath of molten metal, which heating elements are usually constituted of silicon carbide.

The molten metal of the bath is, for example molten tin or a molten tin alloy having a specific gravity greater than that of the glass and in which tin predominates.

In other processes for the treatment and handling of molten or heated glass such as heating of special glass compositions in muffle furnaces and the casting of optical glass compositions to produce lenses etc., carbon elements may constitute the materials of fabrication of the furnaces or moulds or may be associated therewith. Moreover the heating elements in the furnaces may be constituted of silicon carbide.

The normal protective atmosphere which is maintained at a plenum over the bath of molten metal, is constituted mainly by an inert gas, usually nitrogen although helium or argon or mixtures thereof may be used. It is advantageous to maintain a percentage of a reducing gas in the protective atmosphere and hydrogen is usually employed as the reducing constituent of the atmosphere.

It has been found that the hydrogen in the protective atmosphere, while performing a most effective reducing action with respect to the glass and in the case of the "Float process" the bath of molten metal over which the glass is being advanced, is also reactive to some extent at the operating temperatures employed with some of the material, for example carbon and silicon carbide as mentioned above and which are exposed to the plenum of protective atmosphere.

It is a main object of the present invention to employ a protective atmosphere in which hydrogen forms a percentage of the atmosphere but in which the atmosphere is so constituted as to inhibit any reaction between the hydrogen and elements in the equipment structure which are exposed to the protective atmosphere.

The invention is based on the discovery that the presence of methane in such a protective atmosphere enables a condition of equilibrium to be maintained between the hydrogen in the protective atmosphere and the elements which could be attacked by the hydrogen for example exposed elements of the carbon and silicon carbide.

SUMMARY

Accordingly the invention is a process for the manufacture of glass during which the glass is heated whilst in contact with a protective atmosphere, characterised in that the atmosphere comprises hydrogen and methane.

The protective atmosphere may contain an inert gas such as nitrogen, helium or argon or mixtures thereof. For some applications, e.g. heating of glass compositions in a muffle furnace, the use of an inert gas such as nitrogen is preferably avoided, the protective atmosphere employed containing a high proportion of hydrogen.

The use of a protective atmosphere in accordance with the present invention is found to be effective in inhibiting reaction between the hydrogen content and the elements in the equipment structure over a wide range of temperatures particularly above 500° C. for example temperatures in the range of 600° to 1000° C. and above.

As indicated above the present invention is particularly applicable to the "Float process" for the manufacture of flat glass. In this application the protective atmosphere includes an inert gas usually in major amount. Thus the present invention also comprehends a process of manufacturing flat glass during which glass in ribbon form is advanced along a bath of molten metal over which a plenum of protective atmosphere is maintained, characterised in that an inert gas predominates in the atmosphere which also contains from 0.5% to 12% of hydrogen and from 0.01% to 6% of methane.

Depending on conditions prevailing in the particular method of manufacturing flat glass being operated, so the amount of hydrogen in the protective atmosphere can be varied within the range mentioned above. For example, if it is found that the conditions of operations are somewhat oxidising then the percentage of hydrogen would be higher. With a higher percentage of hydrogen the percentage of methane in the atmosphere according to the invention must also be increased in order to maintain the equilibrium between the hydrogen, the carbon or silicon carbide, and the methane, and the percentage of methane present may be expressed in terms of percentage of the amount of hydrogen present.

From this aspect the invention provides a process of manufacturing flat glass during which glass in ribbon form is advanced along a bath of molten metal over which a plenum of protective atmosphere is maintained, characterised in that the protective atmosphere includes from 0.5% to 12% of hydrogen, and methane in a proportion of from 1% to 50% of the hydrogen present, the remainder of the atmosphere being an inert gas. Usually nitrogen is employed as the inert gas.

DESCRIPTION OF THE PREFERRED EMBODIMENTS

Mention is made hereinabove of the various uses of carbon in the tank structure and exposed to the plenum of protective atmosphere which is maintained above the bath of molten metal in the tank structure, for example carbon casting rolls for forming a ribbon of glass and delivering that ribbon to the bath of molten metal, carbon surfaces located either in the side walls of the tank structure containing the bath of molten metal, or spaced from those side walls to define a channel down the centre of the bath against which surfaces the glass glides, or ribbon supporting means formed of carbon which takes up the glass from the bath surface and directs the ribbon of glass to the outlet from the tank structure.

A carbon lining may be provided to the tank structure containing the bath of molten metal. This carbon lining may cover the whole of the floor of the tank structure as well as the side walls of the tank structure, which is usually an elongated tank structure, and the end walls both at the inlet end of the tank structure and at the outlet end, where the outlet end wall defines with an end wall of the roof structure an outlet through which a stiffened ribbon of "Float" glass is discharged from the bath of molten metal. The carbon lining may extend only just to the surface level of the bath of molten metal but may extend above that surface so that the carbon lining of the side walls and end walls of the tank structure are exposed above the surface level of the molten metal to the protective atmosphere in the head space over the bath.

Hydrogen in the protective atmosphere prevents burning of the exposed carbon at the high temperatures involved, but at these temperatures carbon is slightly reactive towards steam and hydrogen. For example, there is a reaction of carbon with hydrogen to produce hydrocarbons in which methane is a main constituent, and according to the invention the methane is maintained in the protective atmosphere along with the hydrogen in an amount greater than the minimum necessary to maintain an equilibrium state between the hydrogen, the carbon and methane, so that the reaction of hydrogen and carbon is suppressed. Similarly the reaction of any water vapour in the head space over the bath with any exposed carbon is suppressed by the presence of the trace of methane in the protective atmosphere.

There is a relation between the amount of hydrogen present in the atmosphere and the amount of methane present. In some circumstances only a small percentage of hydrogen may be required in the atmosphere over the bath, for example a percentage of 0.5%. The likelihood of reaction between the hydrogen and exposed carbon is thereby reduced so that the proportion of methane would only be about 1% of the hydrogen present in order to maintain the equilibrium state which suppresses reaction between the hydrogen and the carbon.

When the conditions are more oxidising more water vapour is present in the protective atmosphere and more hydrogen may be used in the protective atmosphere. For example, up to 12% of hydrogen might be employed in the atmosphere over the bath. In order to maintain the equilibrium between methane, hydrogen and water vapour, the amount of methane present may be required to be up to 50% of the hydrogen present which would mean that the protective atmosphere would contain about 12% of hydrogen along with the inert gas, which is usually nitrogen, and about 6% of methane.

Heating elements mounted in the roof structure over the bath of molten metal are electrical resistance heating elements constituted of silicon carbide, which are known to undergo some reaction with hydrogen in the atmosphere over the bath resulting in ageing of the silicon carbide and it has also been found that the addition of methane to the protective atmosphere over the bath suppresses reactions between hydrogen or water vapour and the silicon carbide and has a beneficial effect on the life of the silicon carbide heating elements in the head space over the bath.

The addition of methane to the protective atmosphere over the bath of molten metal in the "Float" process thus gives the important advantage of extending the life of carbon and silicon carbide elements which are exposed to the protective atmosphere over the bath. The selection of the proportion of methane in the protective atmosphere in relation to the proportion of hydrogen necessary in the protective atmosphere for fulfilling the required reducing conditions in a given set of circumstances in the operation of the process ensures that in any eventuality there is sufficient methane in the atmosphere over the bath to maintain an equilibrium state between the hydrogen, methane and carbon or silicon carbide such that reaction of the hydrogen with the carbon, or silicon carbide, is suppressed.

We claim:

1. A process for manufacturing flat glass during which glass in ribbon form is advanced along a bath of molten metal over which there is maintained a plenum of protective atmosphere which consists of 0.5% to 12% hydrogen, 0.01% to 6% methane together with 82% to 99.49% inert gas, the methane constituting not over 50% of the contents other than the inert gas.

2. A process as claimed in claim 1, characterised in that the inert gas is selected from the group consisting of nitrogen, helium, argon and mixtures thereof.

References Cited

UNITED STATES PATENTS

| | | | |
|---|---|---|---|
| 3,231,354 | 1/1966 | Pilkington | 65—32X |
| 3,238,030 | 3/1966 | O'Connell et al. | 65—32X |
| 3,423,197 | 1/1969 | Loukes et al. | 65—32 |

ARTHUR D. KELLOGG, Primary Examiner

U.S. Cl. X.R.

65—99A